United States Patent [19]

Ernst

[11] Patent Number: 5,509,211
[45] Date of Patent: Apr. 23, 1996

[54] MULTI-COORDINATE PROBE

[75] Inventor: Alfons Ernst, Traunreut, Germany

[73] Assignee: Johannes Heidenhain GmbH, Traunreut, Germany

[21] Appl. No.: 280,862

[22] Filed: Jul. 26, 1994

[30] Foreign Application Priority Data

Jul. 31, 1993 [DE] Germany ............... 43 25 744.5

[51] Int. Cl.⁶ .................... G01B 5/012; G01B 5/016
[52] U.S. Cl. ............................. 33/561; 33/558
[58] Field of Search ...................... 33/556, 557, 558, 33/559, 560, 561; 73/865.8

[56] References Cited

U.S. PATENT DOCUMENTS

| | | | |
|---|---|---|---|
| 4,701,704 | 10/1987 | Fukuyoshi et al. | 33/558 |
| 4,942,671 | 7/1990 | Enderle et al. | 33/559 |
| 4,972,597 | 11/1990 | Kadosaki et al. | 33/561 |
| 5,103,572 | 4/1992 | Ricklefs | 33/561 |

FOREIGN PATENT DOCUMENTS

| | | |
|---|---|---|
| 0270322 | 8/1988 | European Pat. Off. . |
| 0269795 | 8/1988 | European Pat. Off. . |
| 307782 | 3/1989 | European Pat. Off. ............ 33/559 |
| 0361164 | 4/1990 | European Pat. Off. . |
| 2347633 | 4/1974 | Germany . |
| 3508396 | 9/1985 | Germany . |
| 207802 | 12/1982 | Japan ............ 33/559 |
| 28603 | 2/1983 | Japan ............ 33/559 |
| 28601 | 2/1983 | Japan ............ 33/559 |
| 151503 | 9/1983 | Japan ............ 33/559 |
| 197803 | 11/1984 | Japan ............ 33/559 |
| 2006435 | 2/1979 | United Kingdom . |

*Primary Examiner*—Thomas B. Will
*Attorney, Agent, or Firm*—Anderson Kill Olick & Oshinsky

[57] ABSTRACT

A multi-coordinate probe includes at least one tracer pin for scanning an object and deflectable in a plurality of coordinate directions upon engagement with the object, and a plurality of sensors for detecting deflection of the tracer pin and having their respective measuring axes intersecting at the scanning pole, defined by the tracer pin.

7 Claims, 4 Drawing Sheets

MULTI-COORDINATE PROBE

BACKGROUND OF THE INVENTION

The invention relates to a multi-coordinate probe including at least one tracer pin for scanning an object, which tracer pin is deflectable in a plurality of coordinate directions upon engagement with the object and defines a so-called scanning pole, and a plurality of sensors for detecting the deflection of the tracer pin.

The multi-coordinate probe of the above-described type is disclosed by different prior art references. The sensors, which are used for detecting the deflection of the pin upon its engagement with the object, may be of different types. e.g., as a sensor, an electrical switch, a photo-electrical system, or a range sensor can be used. These types of probes are disclosed in Germany patents Nos. 2,347,633 and 3,508, 396 and European patent application No. 0361164. When a multi-coordinate probe of the above-described type when used for scanning an object, has its spacer pin, which has at its end a feeler ball, deflected by the object, and the sensors generate a measuring signal reflecting the amount of spacer pin deflection.

Accordingly, the object of the invention is a multi-coordinate probe of the above-described type having a simple structure and having a high measuring accuracy and a high sensibility.

SUMMARY OF THE INVENTION

This and other objects of the invention, which will become apparent hereinafter, are achieved by providing a probe of the above-described type in which the measuring axes of the detecting sensors intersect at the scanning pole of the spacer pin.

The advantage of the multi-coordinate probe according to the present invention lies in that even a small deflection force causes outputting of a measuring signal, which can be used as a switch signal and as a measuring signal. At that, the structure of the probe remains very simple.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 2 shows a cross-sectional view of a second embodiment of a probe according to the present invention taken along line II—II in FIG. 2a;

DETAILED DESCRIPTION OF THE PREFERRED EMBODIMENTS

Figure 1:
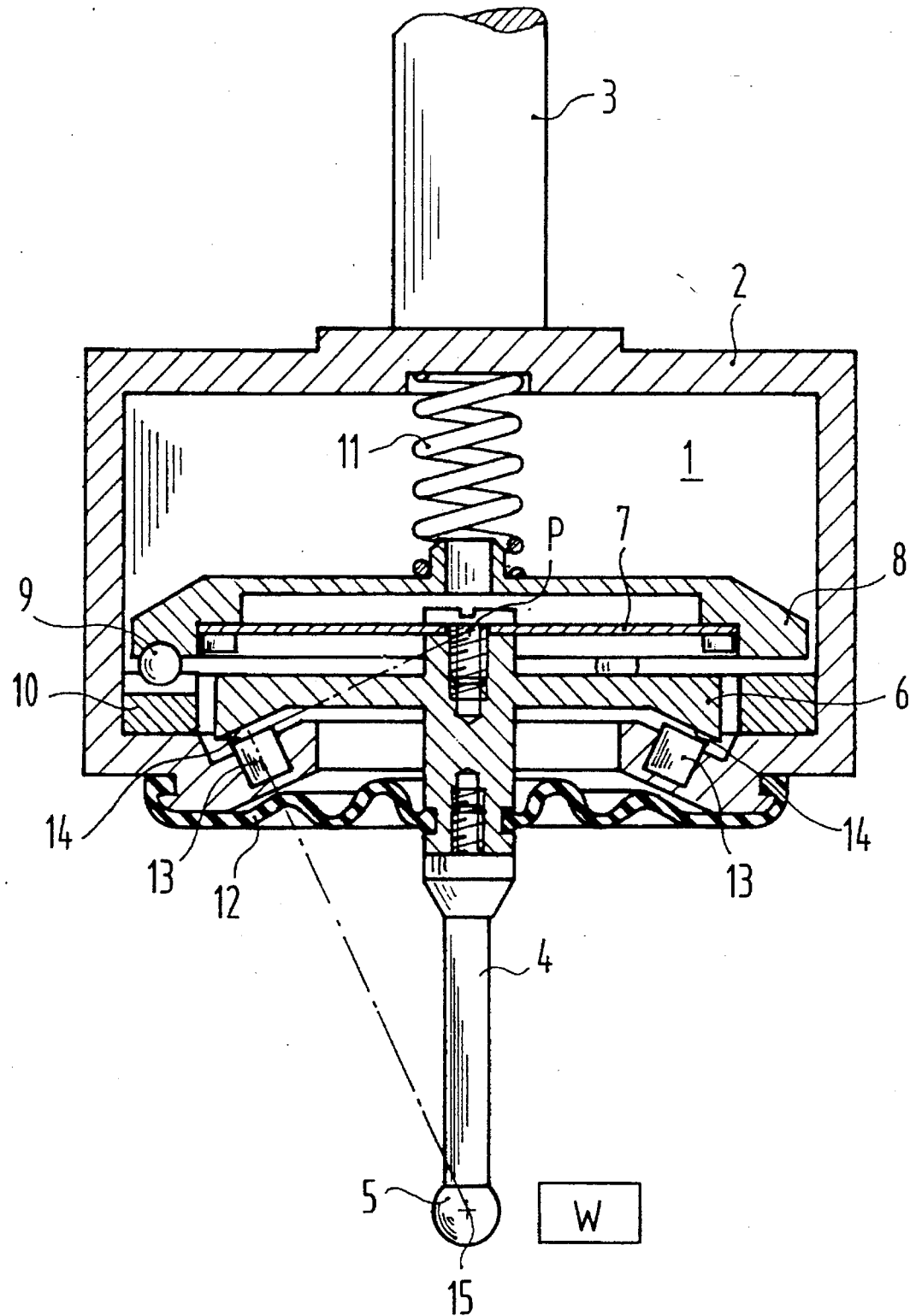
FIG. 1 shows a cross-sectional view of a first embodiment of a probe according to the present invention.

A multi-coordinate probe 1 according to the present invention, which is shown in FIG. 1, includes a housing 2 having a shaft 3 with which the probe can be secured in an appropriate machine. A tracer pin 4 projects from the housing 2 in a direction in which the mounting shaft 3 extends. The tracer pin has at an end thereof a feeler ball 5. The position of the tracer pin 4 in the housing 2 is stabilized by a plate 6, which is rigidly connected with the tracer pin 4. The tracer pin 4 is supported in the housing 2 with an elastic diaphragm 7 which is secured to a ring member 8 which, in turn, is supported on a shoulder 10 of the housing 2 by a bearing 9 and the position of which is statically determined in , per se, known manner. A spring 11 biases the ring 8, the diaphragm 7, and the plate 6 of the tracer pin 4 to their rest or initial position, from which the tracer pin 4 deviates when an object, i.e., the workpiece W is tested. A bellows member 12 sealingly closes the open, tracer pin side of the housing 2.

Sensors 13 are arranged in the housing 2 opposite measuring surfaces 14 of the tracer pin plate 6. The sensor 13 are so aligned with respect to the measuring surfaces 14 that the axes of the sensors 13 intersect with each other in the center of the feeler ball 5, which center defines a so-called scanning pole 15. Thus, the axes of the sensors 13, which correspond to the measuring direction, intersect in the center (scanning pole) 15 of the ball 5. The measuring surfaces 14 extend perpendicular to the axes of the sensors 13, which intersect each other at the center 15 of the feeler ball 5, and represent portions of a sphere having its center in the center 15 of the feeler ball 5. Upon engagement of the feeler ball 5 with the workpiece W, the spring 7 becomes deformed. This results in changing of a distance between the sensor 13 and the measuring surfaces 14. In response to the changing distance between the sensors 13 and the measuring surfaces 14, the sensors 13 generate measuring signals on the basis of which the displacement of the feeler ball 5 in X-, Y- and Z-direction can be calculated. Thus, the displacement of the feeler ball 5 can be detected before the ring member 8 is lifted from the bearing 9.

When the feeler ball 5 operates in an operational mode, which in professional language is called "scanning" or digitization, the deviation of the feeler ball need be very small, so that the ring member 8 can remain in its rest position.

This provides the advantage of a very simple construction of a scanning multi-coordinate probe. The simple construction of the probe permits to achieve a very high precision, because no mechanical deformations occur except the bending of the spacer pin 4, which can be easily taken into consideration by appropriate calculations. The measuring range of this operational mode is rather narrow, however, it is sufficient for the intended purpose. The measuring values are calculated on the basis of signal generated by sensors with an aid of a very simple algorithm.

Specifically, it S1, S2, S3, S4 are signals generated by the sensors 13, there exist, when four sensors 13 are used, in the half of respective coordinates X or -X and Y or -Y, in the first approximation, a following mathematical interrelation $X=(S1-S2)\times(\sin \alpha)/2=C1\times(S1-S2)$ $Y=(S3-S4)\times(\sin \alpha)/2=C1\times(S3-S4)$ $Z=(S1+S2+S3+S4) \cos \alpha/4=C2(S1+S2=S3=S4)$ The generation of a simple switch signal requires simply a corresponding selection of appropriate sensors. The selected sensor may be a range sensor formed as a proximity switch or to have a similar function.

Naturally, incremental or encoded measuring systems can be used as sensors, which can be formed as photoelectric measuring systems or be formed on a basis of another physical principle. Such systems are shown in FIGS. 2 and 3.

To facilitate understanding of the figures, the operationally similar structural elements are designated with the same reference numerals having an index corresponding to the figure number.

Figure 2:
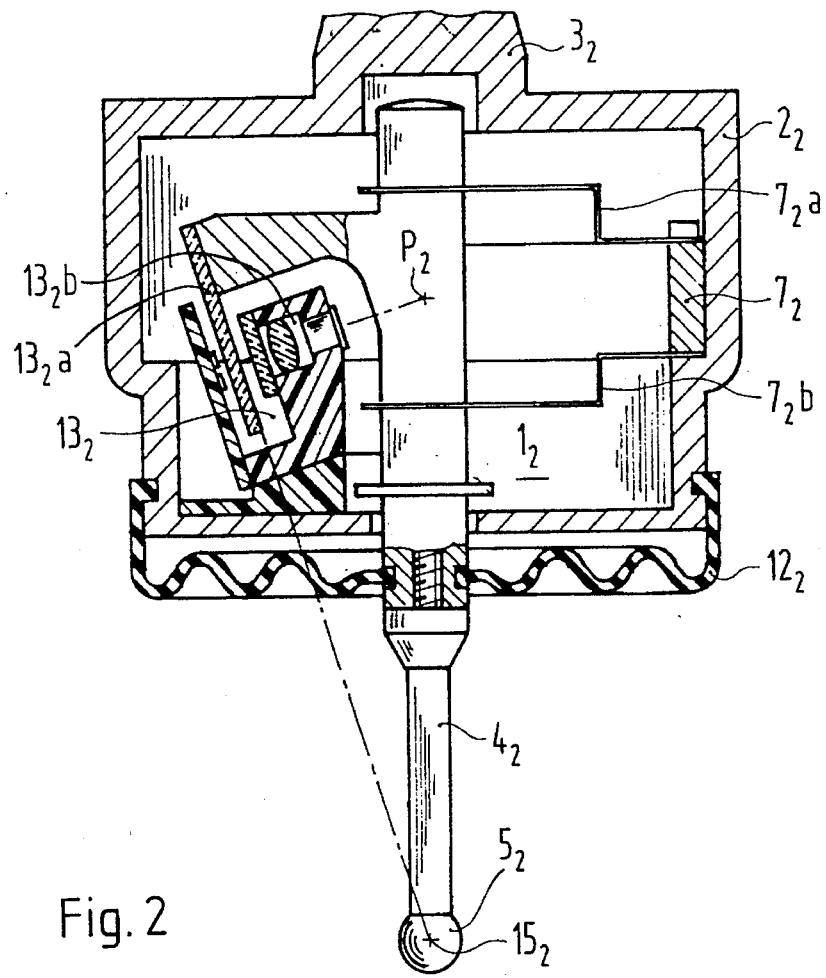
Figure 2A:
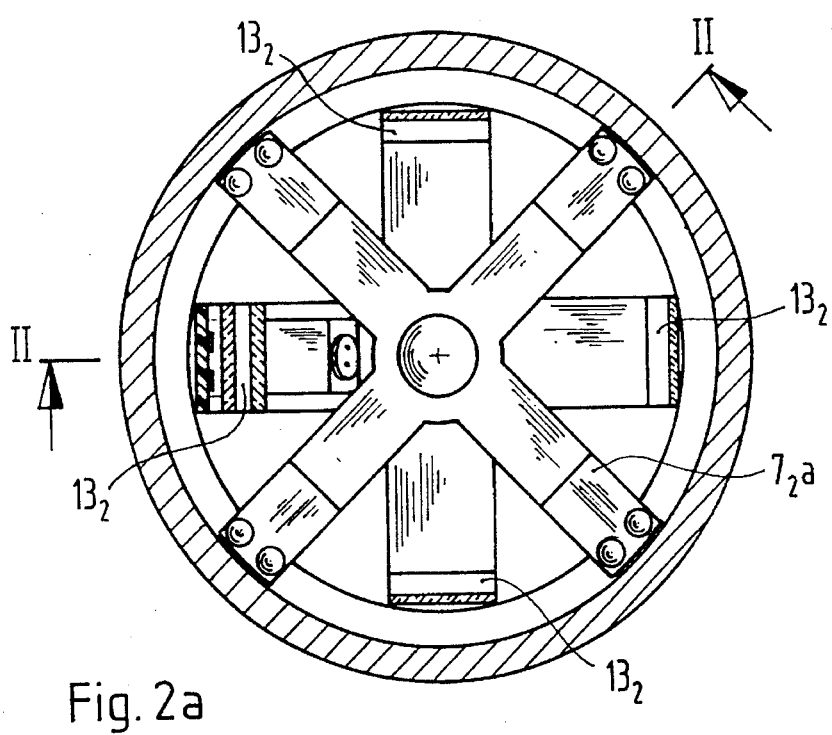
FIG. 2a shows a simplified plan view of the probe shown in FIG. 2.
Figure 3:
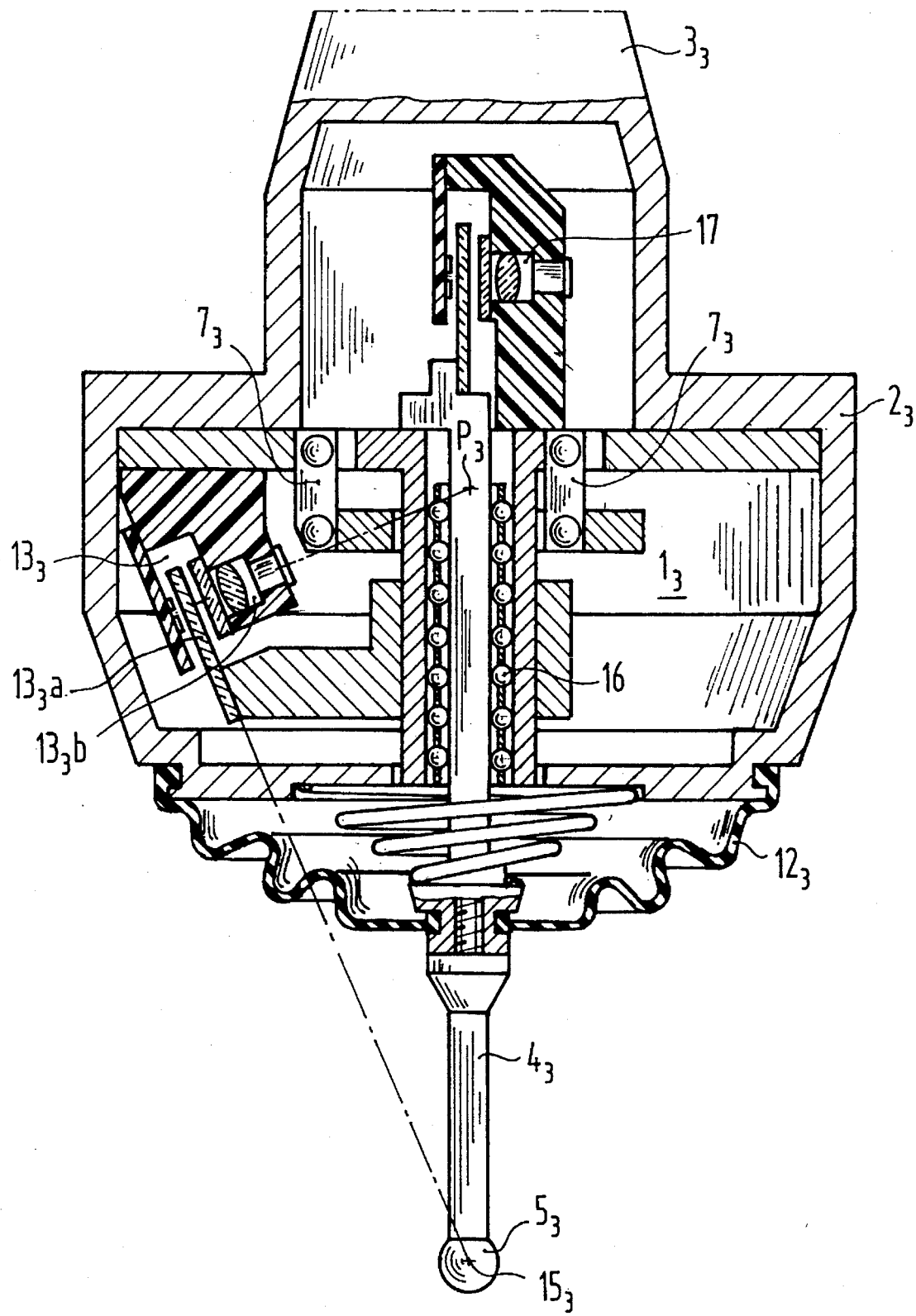
FIG. 3 shows a cross-sectional view of a third embodiment of a probe according to the present invention.

A multi-coordinate probe $1_2$ shown in FIG. 2 includes a housing $2_2$ with a shaft $3_2$, and a spacer pin $4_2$ displaceably supported in the housing $2_2$ by appropriate support means. The support means includes spring means $7_2$ formed of two cross-shaped leaf springs $7_2a$ and $7_2b$ which are formed so that a large lift in axial direction is possible. They can be seen in the plan view shown in FIG. 2a which also shows the arrangement of four sensors $13_2$. The spring portion, which extends in the axial direction, can be longitudinally extended and be used in a manner similar to that of the diaphragm 7 in FIG. 1. Also the leaf springs provide a certain flexibility in the direction of two other coordinates.

By a corresponding selection of the geometry and the elasticity range of the leaf springs, the multi-coordinate probe $1_2$ can be provided with the same characteristic curve of the measuring force, also called stiffness, in the directions of coordinates X, Y, Z.

The measuring pick-ups or sensors $13_2$ are arranged between the arms of the cross-shaped leaf springs $7_2a$ and $7_2b$. The sensors $13_2$ in this embodiment are formed each as a photoelectrical system having a scale $13_2a$ and a scanning head $13_2b$. When a deflecting force acts on the feeler ball 5 in the X- or Y- direction, the spacer pin $4_2$ performs a rocking motion about its rocking point $P_2$. The optical axis of the scanning head $13_2b$ extends through the point $P_2$ and perpendicular to the measuring direction of the scale $13_2a$. Therefore, with a small deviation of the feeler ball 5 in the X- and Y- direction, the distance between the scale $13_2a$ and the scanning head $13_2b$ does not change.

Another embodiment of a multi-coordinate probe according to the present invention is shown in FIG. 3. In this embodiment, the probe includes an additional longitudinal guide formed as ball bearing guide 16. The guide 16 provides for an increased measuring path in Z- direction. The probe $1_3$ has sensors which are formed each as a photoelectrical measuring device 17. With an increased measuring path in Z- direction, the flexibility of the of the elastic element $7_3$ in that direction is not required and the elastic element $7_3$ can be formed as a cardan spring link. The measuring error in the Z- direction, which results from frictional forces, caused by displacement along the ball bearing guide 16, and from the elasticity of the spring link $7_3$, can be detected and corrected by the four angularly arranged measuring systems $13_3$ (of which only one is shown in FIG. 3).

Figure 4:
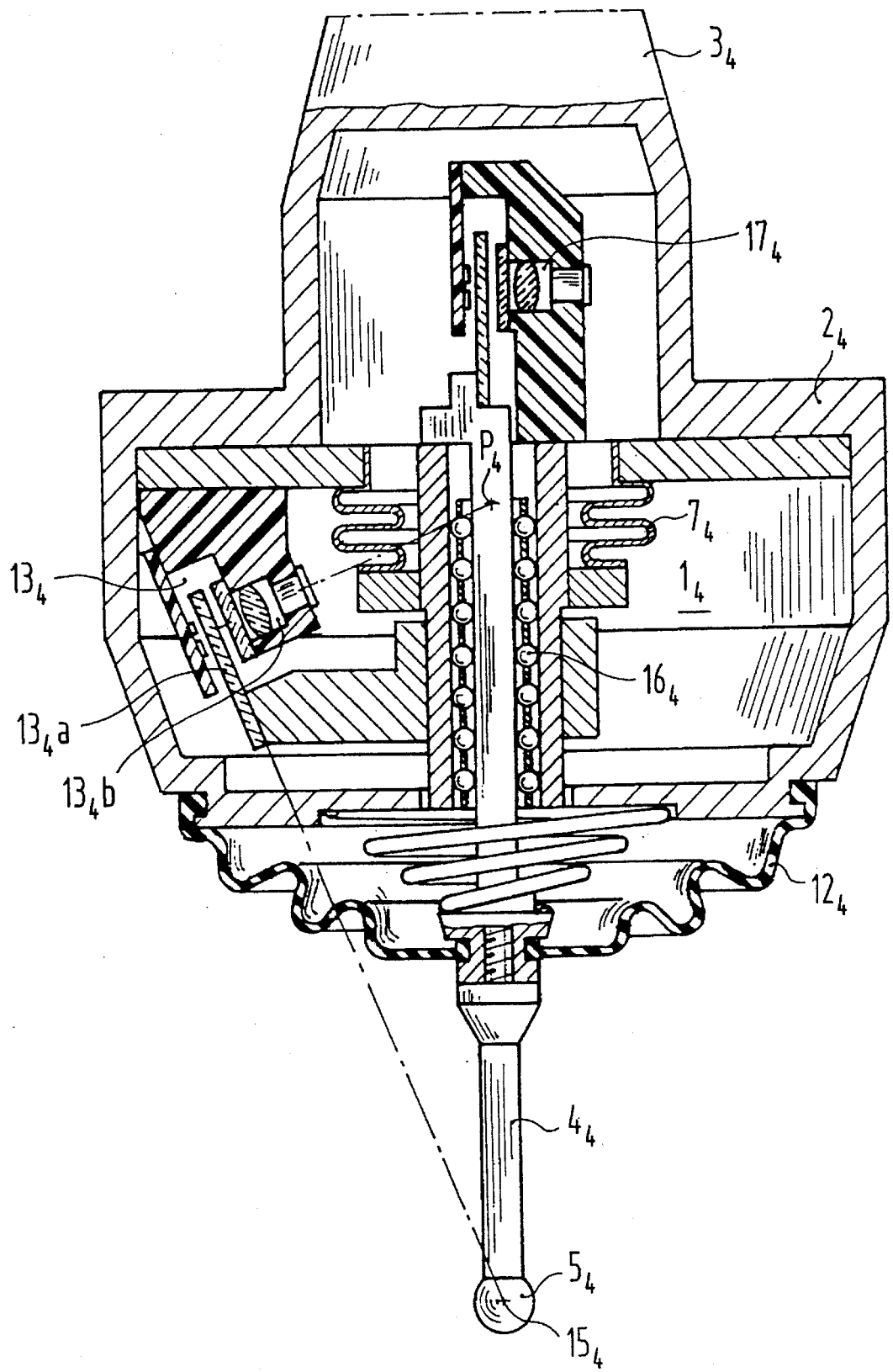
FIG. 4 shows a fourth embodiment of a probe according to the present invention.

A multi-coordinate probe according to the present invention, which is shown in FIG. 4, distinguishes from the probe shown in FIG. 3 in that, instead of a cardan spring link, a diaphragm $7_4$ is used.

While the present invention was shown and described with reference to the preferred embodiment, various modifications thereof will be apparent to those skilled in the art and, therefore, it is not intended that the invention be limited to the disclosed embodiments and/or details thereof, and departures may be made therefrom within the spirit and scope of the appended claims.

What is claimed is:

1. A multi-coordinate probe, comprising:

a housing;

at least one tracer pin for scanning an object, the tracer pin being located in the housing and having a portion, extending from the housing, and a feeler element provided at a free end of the extending portion for engaging the object and having a point defining a scanning pole;

means for supporting the tracer pin in the housing and for enabling deflection of the tracer pin in a plurality of coordinate directions upon engagement of the feeler element with the object; and a plurality of sensors located in the housing for detecting the deflection of the tracer pin and having respective measuring axes thereof intersecting at the scanning pole.

2. A multi-coordinate probe as set forth in claim 1, wherein the feeler element is formed as a ball, a center of which defines the point defining the scanning pole.

3. A multi-coordinate probe as set forth in claim 1, wherein the plurality of sensors includes at least three sensors having their measuring axes extending perpendicular to respective measuring surfaces defining an amount of deflection of the tracer pin.

4. A multi-coordinate probe as set forth in claim 2, wherein the sensors comprise respective measuring surfaces, which define the deflection of the tracer pin and which form portions of a sphere having a center thereof lying in the center of the feeler ball.

5. A multi-coordinate probe as set forth in claim 1, wherein the plurality of sensors comprises range sensors.

6. A multi-coordinate probe as set forth in claim 1, wherein the plurality of sensors comprises one of incremental measuring systems and encoded measuring systems.

7. A multi-coordinate probe as set forth in claim 1, wherein the plurality of sensors comprises photo-electrical systems functioning as sensors.

* * * * *